United States Patent
McClelland et al.

(10) Patent No.: US 7,052,788 B2
(45) Date of Patent: May 30, 2006

(54) REGULATOR AND METHOD OF REGULATING FUEL FLOW TO A FUEL CELL BY ADSORPTION

(75) Inventors: Paul H. McClelland, Corvallis, OR (US); Philip Harding, Albany, OR (US); Ravi Prasad, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 377 days.

(21) Appl. No.: 10/284,735

(22) Filed: Oct. 31, 2002

(65) Prior Publication Data
US 2004/0086770 A1   May 6, 2004

(51) Int. Cl.
*H01M 8/04* (2006.01)

(52) U.S. Cl. ............... 429/22; 429/25; 429/34
(58) Field of Classification Search ........... 429/22, 429/23, 24, 25, 34, 38, 39
See application file for complete search history.

(56) References Cited

U.S. PATENT DOCUMENTS

| | | | |
|---|---|---|---|
| 3,716,416 A | | 2/1973 | Adlhart et al. |
| 5,522,988 A | | 6/1996 | Cortes et al. |
| 5,935,443 A | * | 8/1999 | Anderson et al. ........... 210/656 |
| 6,294,068 B1 | | 9/2001 | Petrovic et al. |
| 6,358,639 B1 | | 3/2002 | Oko et al. |
| 6,361,582 B1 | | 3/2002 | Pinnau et al. |
| 6,365,294 B1 | | 4/2002 | Pintauro et al. |
| 6,447,941 B1 | | 9/2002 | Tomimatsu et al. |
| 6,475,655 B1 | * | 11/2002 | Nakanishi et al. ........ 429/34 X |
| 6,713,206 B1 | * | 3/2004 | Markoski et al. ............. 429/38 |
| 2002/0022166 A1 | * | 2/2002 | Klein et al. .................... 429/22 |
| 2002/0127458 A1 | * | 9/2002 | Pratt et al. ..................... 429/34 |
| 2004/0157095 A1 | * | 8/2004 | Bruck et al. .............. 429/34 X |

FOREIGN PATENT DOCUMENTS

EP   1148568   * 10/2001

* cited by examiner

*Primary Examiner*—Stephen J. Kalafut

(57) ABSTRACT

A fuel cell flow regulator includes a fuel cell fuel flow path, the fuel flow path including a solid-state material for regulating a flow of fuel along the fuel flow path by adsorption.

33 Claims, 4 Drawing Sheets

REGULATOR AND METHOD OF REGULATING FUEL FLOW TO A FUEL CELL BY ADSORPTION

TECHNICAL FIELD

The present invention relates to fuel cells. More particularly, the present invention relates to fuel flow regulation for fuel cells.

BACKGROUND

Over the past century the demand for energy has grown exponentially. With the growing demand for energy, many different energy sources have been explored and developed. One of the primary sources of energy has been, and continues to be, the combustion of hydrocarbons. However, the combustion of hydrocarbons is usually incomplete and releases non-combustibles that contribute to smog as well as other pollutants in varying amounts.

As a result of the pollutants created by the combustion of hydrocarbons, the desire for cleaner energy sources has increased in recent years. With the increased interest in cleaner energy sources, fuel cells have become more popular and more sophisticated. Research and development on fuel cells has continued to the point where many speculate that fuel cells will soon compete with gas turbines generating large amounts of electricity for cities, internal combustion engines powering automobiles, and batteries that run a variety of small and large electronics.

Fuel cells conduct an electrochemical energy conversion of hydrogen or other fuel and oxygen into electricity and heat. In some cases, conversion of a hydrocarbon fuel to hydrogen can occur within the fuel cell in a process known as "internal reforming." Fuel cells are similar to batteries, but they can be "recharged" while providing power.

Fuel cells provide a DC (direct current) voltage that may be used to power motors, lights, or any number of electrical appliances. There are several different types of fuel cells, each using a different chemistry. Fuel cells are usually classified by the type of electrolyte used. The fuel cell types are generally categorized into one of five groups: proton exchange membrane (PEM) fuel cells, alkaline fuel cells (AFC), phosphoric-acid fuel cells (PAFC), solid oxide fuel cells (SOFC), and molten carbonate fuel cells (MCFC).

Most fuel cells typically include four basic elements: an anode, a cathode, an electrolyte, and a catalyst arranged on each side of the electrolyte. The anode is the negative post of the fuel cell and conducts electrons that are freed from hydrogen molecules such that the electrons can be used in an external circuit. The anode includes channels to disperse the fuel gas as evenly as possible over the surface of the catalyst.

The cathode is the positive post of the fuel cell, and typically includes channels etched therein to evenly distribute oxygen (usually air) to the surface of the catalyst. The cathode also conducts the electrons back from the external circuit to the catalyst, where they can recombine with the hydrogen ions and oxygen to form water.

One of the difficulties encountered with fuel cells is the regulation of excessive flow and/or pressure from the fuel source feeding the fuel cell. It is quite common to have flow or pressure spikes from the fuel source during fuel cell operation. The flow irregularities may be a result of start up, temperature changes, fluctuations in power demands on the fuel cell, or other phenomena. Flow increases and pressure spikes cause operational instability and flood the fuel cell with fuel that cannot be efficiently used.

Accordingly, there has been some use of flow regulators in fuel cells to reduce pressure and/or flow spikes. The flow regulators often consist of a set of capillaries. However, capillary flow regulators have a small dynamic range, and typical regulators add significantly to the cost of the fuel delivery system. There has also been some use of a bladder and rubber diaphragm to regulate the flow and/or pressure delivered to the fuel cell, but such systems are not sufficiently robust for long-term use and have limited efficacy across varying fuel types.

Thus, there is a need in the art for means of regulating the flow and/or pressure of fuel delivered to a fuel cell.

SUMMARY

In one of many possible embodiments, the present specification describes a fuel cell flow regulator including a fuel cell fuel flow path, the fuel flow path including a solid-state material for regulating a flow of fuel along said fuel flow path.

The present specification also describes a method of regulating flow between a fuel cell and a fuel source including disposing a solid-state adsorptive layer between the fuel cell and the fuel source.

The present specification also describes a method of making a fuel cell fuel flow regulator including coating a column or a packing material with a gas adsorbing material and inserting the column or packing material into a fuel cell flow path.

BRIEF DESCRIPTION OF THE DRAWINGS

The accompanying drawings illustrate various embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DETAILED DESCRIPTION

Illustrative embodiments of the principles disclosed herein are described below. As will be appreciated by those skilled in the art, the principles described herein can be implemented in a wide variety of fuel cell applications including, but not limited to, SOFCs, PEM fuel cells, AFCs, PAFCs, and MCFCs.

Figure 1:
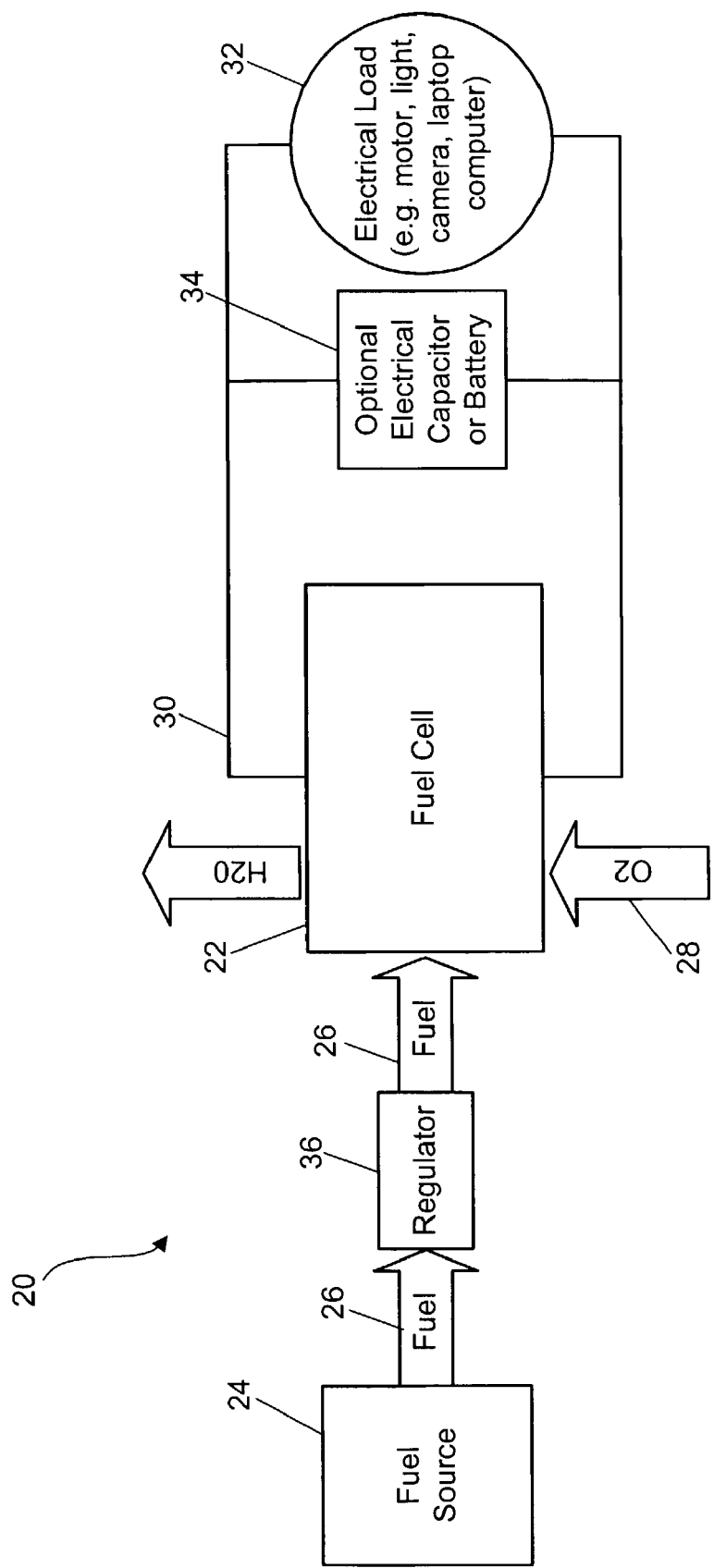
FIG. 1 is a diagrammatical illustration of a fuel cell system according to one embodiment of the present invention.

Turning now to the figures, and in particular to FIG. 1, an overview of an electronic device (20) using a fuel cell power system is shown according to one example of the principles described. According to the embodiment of FIG. 1, there is a fuel cell (22) in fluid communication with a fuel source (24). The fuel source (24) provides a supply of fuel along a fuel flow path represented by arrows (26). A supply of oxygen, which may be provided by ambient air, is also in fluid communication with the fuel cell (22) as represented by another arrow (28). As shown in FIG. 1, water ($H_2O$) may be produced as a byproduct of the operation of the fuel cell (22).

The fuel cell (22) may provide power through an external circuit (30) to an electrical load (32). The electrical load (32) may comprise any electrically operated device including, but not limited to, a motor, a light, a digital camera, a laptop computer, and other devices consuming electricity. The external circuit (30) may also be connected to an optional electrical capacitor or battery (34), which is shown in electrical parallel with the fuel cell (22). The electrical capacitor or battery (34) may provide auxiliary power to the electrical load (32).

According to the embodiment of FIG. 1, a fuel flow regulator (36) may be disposed in the fuel flow path (26) to regulate fuel pressure and/or flow. The fuel flow regulator (36) is arranged between the fuel source (24) and the fuel cell (22) to smooth out pressure and/or flow irregularities of the fuel flowing to the fuel cell (22). The fuel flow regulator of the present embodiment may be a passive regulator/accumulator.

Figure 2:
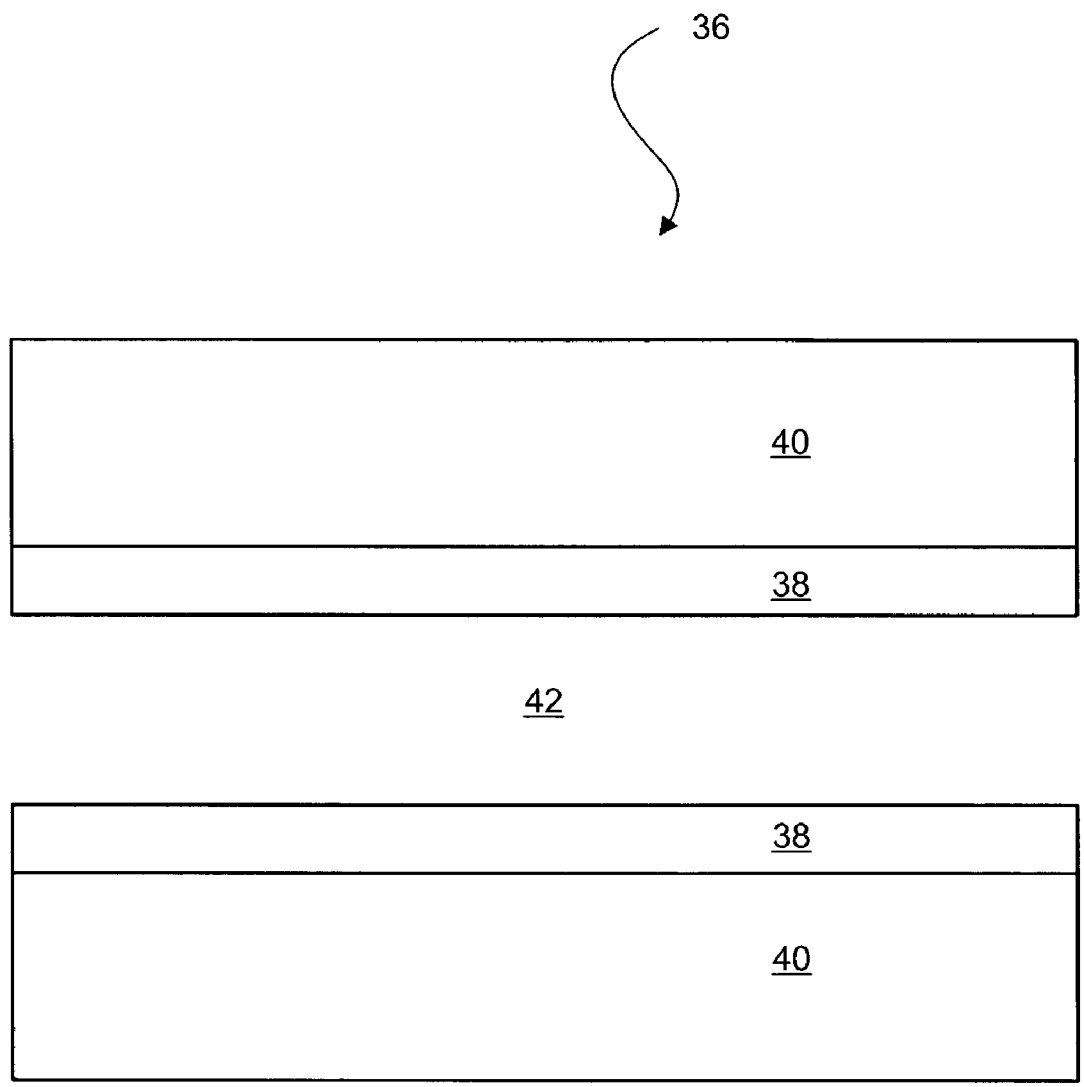
FIG. 2 is a cross section of a chromatography column according to one embodiment of the present invention.

Referring to FIG. 2, a cross-section of a portion of the fuel flow regulator (36) is shown in detail according to one possible example of the principles described herein. The fuel flow regulator (36) may include a solid-state layer, such as a stationary phase (38), that is provided in a column through which the fuel passes to the fuel cell. It will be understood by one of skill in the art having the benefit of this disclosure, that the term "column" does not necessarily infer any specific geometry.

In FIG. 2, the column (40) is shown as a tube in cross-section, with the stationary phase (38) being, for example, coated onto or disposed along an inner surface of a tube (42) of the column (40). The "tube" (42) shown in FIG. 2 may be just one of many pores through a column substrate. The column (40) may be, for example, a gas or gas-solid chromatography column (40). The column (40) may also be, for example, a packing material that may be coated with the stationary phase (38) and inserted into the fuel flow path (26, FIG. 1).

The stationary phase (38) is a non-moving, gas-adsorbing material layer. Depending on the fuel used (the moving or "mobile" phase), the affinity of the fuel to adsorption by the stationary phase smoothes out any pressure or flow spikes occurring along the fuel flow path (26, FIG. 1). The stationary phase (38) adsorbs, or holds, certain chemicals such as the fuel or constituents of the fuel for a period of time, depending on the affinity between that chemical and the stationary phase material, before releasing the adsorbed material back into the fuel flow.

As described above, increased fuel flow and/or pressure spikes from the fuel source (24, FIG. 1) may be a result of one or more of several factors. Spikes may result from start-up conditions, temperature changes, variations in load demand on the fuel cell (22, FIG. 1), or other phenomena. For example, if a gaseous fuel such as hydrogen or acetylene is generated from a solid either by liquid/solid interaction or by a thermal or spark initiated release, pressure overrun (spiking) is probable.

The solid-state layer or stationary phase (38) may be introduced to the fuel flow path (26, FIG. 1) to reduce pressure spiking. The most common stationary phases in gas chromatography columns are polysiloxanes, which contain various substituent groups to change the polarity of the phase. The nonpolar end of the spectrum is polydimethyl siloxan, which can be made more polar by increasing the percentage of phenyl groups on the polymer. For non-polar analytes (fuels), polyethylene glycol or "carbowax" may be used as the stationary phase. Most hydrocarbons and other fuels commonly used to power fuel cells are non-polar. Therefore the solid-state layer or stationary phase may be a carbowax such as paraffin. Adsorbing material sets for use as a stationary phase (including those described above) are available from a variety of analytical chemistry suppliers.

However, according to alternative embodiments of the present invention, the solid-state layer or stationary phase (38) may also be a metal foil or a porous metal matrix. Such metal foils or matrixes may, for example, be made primarily of palladium or feature a thin palladium coating.

To utilize a solid-state layer or "stationary phase" to smooth spikes in a fuel cell fuel source (24, FIG. 1), the solid-state layer or stationary phase (38) may be thinly coated onto a tubular or porous substrate or support. In some embodiments, the support may include cast zeolite or diatomaceous earth. According to the embodiment of FIG. 2, the support is arranged as a packing or tubular column (40). However, other similar structures which provide narrow convoluted paths for the gas to flow through while interacting with the adsorbing layer (38) may also be used to decrease and distribute a pressure and/or flow spike to the fuel cell (22, FIG. 1).

According to some embodiments of the present invention, after the stationary phase (38) is coated onto or into the column (40), it is crosslinked to increase the thermal stability of the stationary phase (38). Crosslinking the stationary phase (38) helps to prevent or reduce gradual bleeding of the stationary phase (38) in the presence of a flow of fuel.

The gas chromatography coated columns and packs described above may advantageously have variable sizes to allow fast, regular flow to the fuel cell (22, FIG. 1) through large pore areas (42), yet the columns limit the total flow because of the small percentage of large pores and the diffusion and adsorption of the fuel (hydrogen and/or hydrocarbons, etc.) in the predominately small pore sections.

Typically, gas and gas-solid chromatography columns are used to separate and detect individual components of a gas mixture. However, the present invention employs chromatography columns to regulate pressure and/or flow spikes before they reach the fuel cell (22, FIG. 1). Chromatography usually refers to a separation process achieved by distributing substances to be separated by a stationary phase. Different elements and compounds of the mobile phase are preferentially attracted to the stationary phase, and are retained for a certain period of time by the stationary phase. The time that each element or compound is retained by the stationary phase is different depending on the affinity between the element or compound and the stationary phase. Thus, elements and/or compounds can be separated by a chromatography column because the different elements and/or compounds are retained for different time periods, leading to the release of like elements in separate bands or groups.

However, the chromatography columns are utilized in a unique and advantageous way according to embodiments of the present invention. The present invention includes inserting a solid-state layer, such as a stationary phase (38) of a chromatography column (40), into the fuel flow path (26, FIG. 1) of a fuel cell. When flow and/or pressure spikes occur in the fuel flow path (26, FIG. 1), the spikes are smoothed as the different components of the fuel passing the solid-state layer (38) are retained or adsorbed by the solid-state layer for different periods of time. The retention of the fuel components tends to reduce the flow rate and/or pressure as the fuel navigates the solid-state layer and continues to the fuel cell (22, FIG. 1).

Because fuel cells cannot utilize fuel beyond a maximum fuel rate, the introduction of a solid-state layer regulator results in less waste and higher efficiency. Fuel from a spike that would otherwise pass through the fuel cell (22, FIG. 1) without being used may be fully utilized by employing the regulator of the present invention. In addition, the solid-state layer of the present invention is passive and inexpensive, and does not require any monitors, controls, or electronics.

Figure 3:
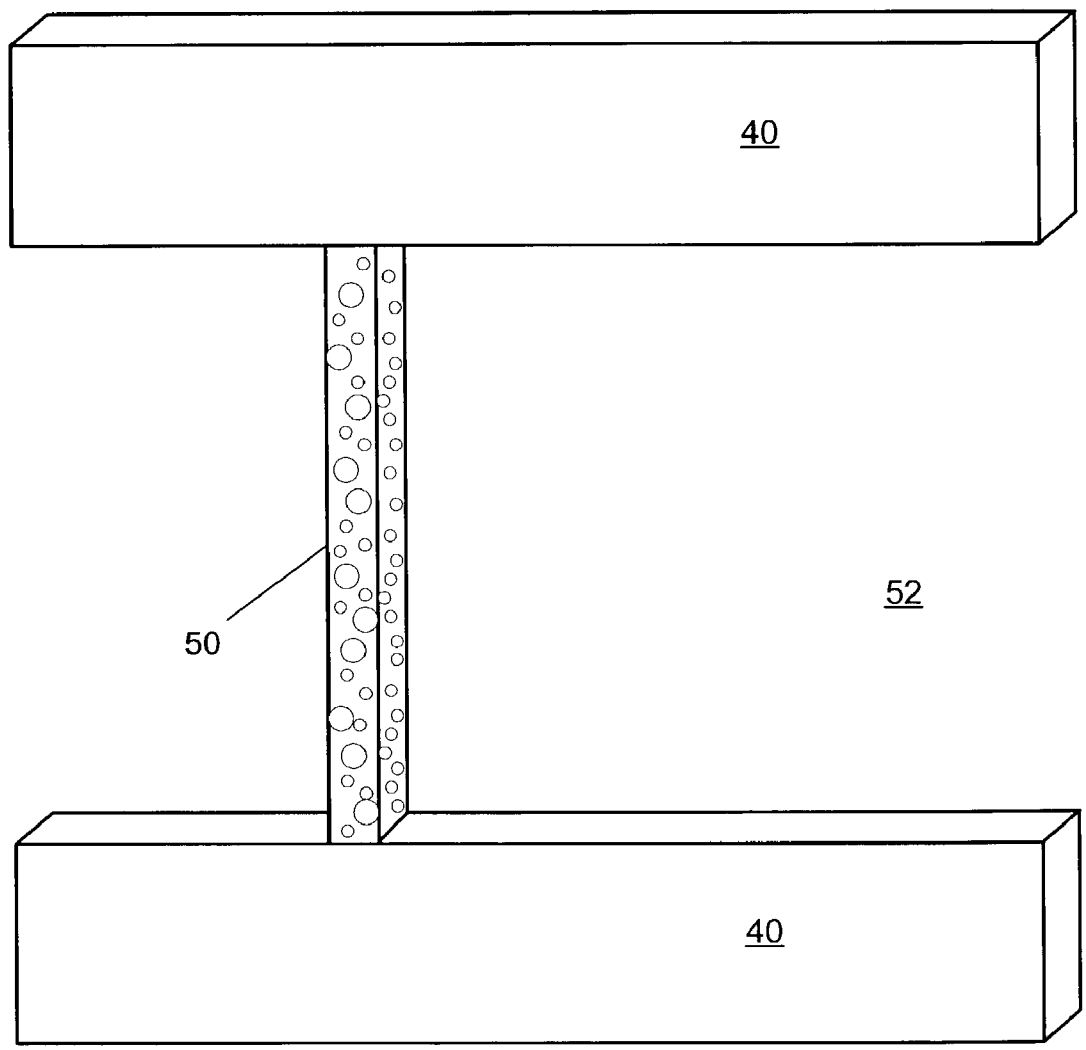
FIG. 3 is a perspective view of a chromatography column according to another embodiment of the present invention.

Turning next to FIG. 3, a fuel flow regulator according to another embodiment of the present invention is shown. The stationary phase, according to the embodiment of FIG. 3, is a planar porous network (50) disposed in a fuel flow path (52) defined by the column (40). As mentioned above, "column" does not infer any specific geometry and may be rectangular, as shown, tubular or any other shape. The planar porous network (50) is representative of a fibrous or other material suitably matched to adsorb molecules passing through the fuel flow path (52) to smooth out any pressure spikes. The material sets for use with planar porous network (50) may be chosen as described above to suit the particular fuels used.

The solid-state layer regulators used in embodiments of the present invention may be particularly useful with solid oxide fuel cells (SOFC's) that have internal reforming because such fuel cells can utilize a variety of fuels (e.g. hydrogen, hydrocarbons, alcohols, etc.) and are not limited to pure hydrogen sources.

Figure 4:
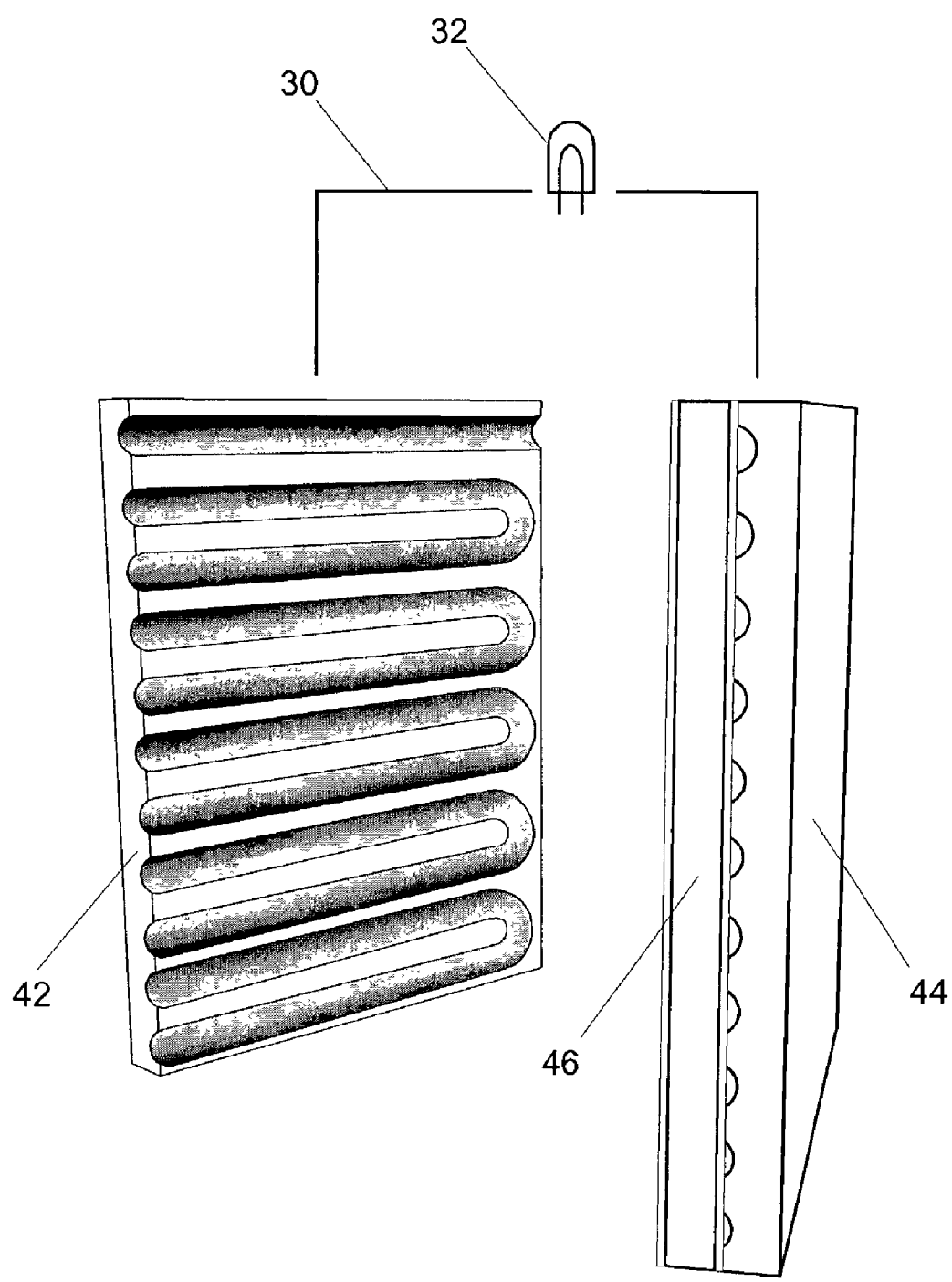
FIG. 4 is a perspective view of a fuel cell according to one embodiment of the present invention.

Turning next to FIG. 4, a fuel cell (22) according to an embodiment of the present invention is shown in more detail. The fuel cell (22) includes three basic elements: an anode (42), a cathode (44), and an electrolyte (46). The anode (42) and the cathode (44) are arranged on either side of the electrolyte (46). The anode (42) is the negative post of the fuel cell (22) and conducts electrons that are freed from the fuel to the external circuit (30). The cathode (44) is the positive post of the fuel cell, and is exposed to an oxygen supply (usually ambient air). The cathode (44) also conducts the electrons back from the external circuit, where they combine with molecular oxygen to form oxygen ions.

The electrolyte (46) of the present embodiment is a solid oxide membrane. The membrane is typically a high temperature ceramic material that conducts only oxygen ions. This membrane (24) also prevents the passage of electrons.

In some embodiments, the anode (42) includes a ceramic/metal mixture (cermet) (e.g., yttria stabilized zirconia/nickel, samaria doped ceria/nickel, etc.). The anode (42) may also include other or alternative materials based on the particular fuel cell application. The anode (42) is porous so as to maximize the three-phase boundary. The three-phase boundary is a region at which the fuel, the anode (42), and the electrolyte (46) meet. The anode (42) may include the ceramic/metal mixtures mentioned above which act as a catalytic agent to facilitate the oxidation of the fuel.

The cathode (44) may include a composite mixture of an electrocatalyst and oxygen ion conductor (e.g., lanthanum strontium maganate/yttria stabilized zirconia, samarium strontium cobaltite/samaria doped ceria, etc.). The cathode (44) may also be porous so as to maximize the three-phase boundary, but this is not necessarily so. The three-phase boundary on the cathode (44) side defines an edge at which the air, the cathode (44), and the electrolyte (46) meet. The cathode (44) materials discussed above facilitate the reduction of the oxidant.

The fuel flow regulators described herein, that are embodiments of the present invention, can be advantageously used to regulate the flow of fuel into the illustrated fuel cell of FIG. 4. However, it will be understood by those of skill in the art, having the benefit of this disclosure, that solid-state adsorptive materials, such as in a gas chromatography column as discussed above, may be used with any or all of the aforementioned fuel cell types and are not limited to use with SOFCs. In addition, it will be understood by those of skill in the art having the benefit of this disclosure that chromatography columns may be generally categorized into one of two classifications: packed or capillary. According to the embodiments of the present invention, either of the column types may be utilized as a regulator to fuel cell fuel flow.

The preceding description has been presented only to illustrate and describe embodiments of invention. It is not intended to be exhaustive or to limit the invention to any precise form disclosed. Many modifications and variations are possible in light of the above teaching.

The foregoing embodiments were chosen and described in order to illustrate principles of the invention and some practical applications. The preceding description enables others skilled in the art to utilize the invention in various embodiments and with various modifications as are suited to the particular use contemplated. It is intended that the scope of the invention be defined by the following claims.

What is claimed is:

1. A fuel flow regulator for a fuel cell comprising:
   a fuel cell fuel flow path, said fuel flow path comprising a solid-state material for regulating a flow of fuel along said fuel flow path by adsorption;
   wherein said flow path comprises a tubular column and said solid-state material comprises a gas adsorbing layer coated on said tubular column.

2. The fuel cell flow regulator of claim 1, wherein said solid-state material comprises a carbowax.

3. The fuel cell flow regulator of claim 2, wherein said solid-state material comprises paraffin.

4. A fuel flow regulator for a fuel cell comprising:
   a fuel cell fuel flow path, said fuel flow path comprising a solid-state material for regulating a flow of fuel along said fuel flow path by adsorption;
   wherein said solid-state material comprises metal foil lining an interior of a passageway of said fuel flow path between a fuel source and a fuel cell.

5. The fuel flow regulator of claim 4, wherein said metal foil is disposed so as to selectively adsorb said fuel for a period of time and then release said fuel unchanged back into said fuel flow path.

6. A fuel cell system comprising:
   a fuel cell;
   a fuel source;
   a fuel flow path between said fuel cell and said fuel source; and
   a fuel flow regulator disposed in said fuel flow path comprising a solid-state adsorptive material for selectively adsorbing fuel passing from said fuel source to said fuel cell for a period of time after which said adsorptive material releases said fuel so as to regulate fuel flow along said fuel flow path.

7. A fuel cell system comprising:
   a fuel cell;
   a fuel source;
   a fuel flow path between said fuel cell and said fuel source; and
   a fuel flow regulator disposed in said fuel flow path comprising a solid-state adsorptive material;
   wherein said solid-state material comprises a gas chromatography column disposed in said fuel flow path.

8. The fuel cell system of claim 7, wherein said gas chromatography column comprises said adsorptive material on a porous support.

9. The fuel cell system of claim 8, wherein said adsorptive material comprises a carbowax.

10. The fuel cell system of claim 8, wherein said porous support comprises zeolite.

11. The fuel cell system of claim 6, wherein said fuel cell comprises a proton exchange membrane (PEM) or solid oxide fuel cell.

12. A fuel cell system comprising:
a fuel cell;
a fuel source;
a fuel flow path between said fuel cell and said fuel source; and
a fuel flow regulator disposed in said fuel flowpath comprising a solid-state adsorptive material for selectively adsorbing fuel passing from said fuel source to said fuel cell;
wherein said solid-state adsorptive material is coated on a packing disposed in said fuel path.

13. A power generating apparatus comprising:
a fuel cell coupled to a chromatography column for regulating a flow of fuel to said fuel cell.

14. The apparatus of claim 13, wherein said chromatography column comprises a gas chromatography column.

15. The apparatus of claim 13, wherein said chromatography column comprises a gas-solid chromatography column.

16. An electronic device comprising:
a fuel cell providing power to an electrical load;
a fuel source;
a fuel flow path between said fuel cell and said fuel source; and
a fuel flow regulator disposed in said fuel flow path comprising a solid-state adsorptive material for selectively adsorbing fuel passing from said fuel source to said fuel cell for a period of time after which said adsorptive material releases said fuel so as to regulate fuel flow along said fuel flow path.

17. An electronic device comprising:
a fuel cell providing power to an electrical load;
a fuel source;
a fuel flow path between said fuel cell and said fuel source; and
a fuel flow regulator disposed in said fuel flow path comprising a solid-state adsorptive material;
wherein said flow regulator comprises a tubular column and said solid-state adsorptive material comprises a gas-adsorbing layer coated on said tubular column.

18. The electronic device of claim, 17, wherein said solid-state material comprises a carbowax.

19. An electronic device comprising:
a fuel cell providing power to an electrical load;
a fuel source;
a fuel flow path between said fuel cell and said fuel source; and
a fuel flow regulator disposed in said fuel flow path comprising a solid-state adsorptive material;
wherein said solid-state materiel comprises a gas or gas-solid chromatography column.

20. A method of regulating flow between a fuel cell and a fuel source comprising disposing an adsorptive material in a fuel flow path between said fuel cell and said fuel source, wherein said adsorptive material selectively adsorbs said fuel for a period of time and then releases said fuel so as to minimize pressure or flow spikes occurring along said fuel flow path.

21. The method of claim 20, further comprising adsorbing fuel flowing from said fuel source with a solid-state material.

22. A method of regulating flow between a fuel cell and a fuel source comprising disposing an adsorptive material in a fuel flow path between said fuel cell and said fuel source, wherein said adsorptive material comprises a solid-state material that selectively adsorbs said fuel wherein said solid-state material is disposed in a gas or gas-solid chromatography column.

23. A method of passively smoothing fuel flow fluctuations to a fuel cell comprising passing fuel from a fuel source by an adsorbing material, wherein said adsorbing material is housed in a chromatography column.

24. The method of claim 23, wherein said adsorbing material comprises a carbowax.

25. A method of passively smoothing fuel flow fluctuations to a fuel cell comprising passing fuel from a fuel source through a flow path between said fuel source and said fuel cell, said flow path comprising an adsorbing material, wherein said adsorbing material comprises a metal foil or a porous metal matrix and adsorbs said fuel for a period of time and then releases said fuel back into said flow path so as to minimize fuel flow fluctuations to said fuel cell.

26. A method of making a fuel cell fuel flow regulator comprising:
coating a column or a packing material with a gas adsorbing material and inserting said column or packing material into a fuel cell flow path; and
cross-linking the coating to increase the thermal stability of the coating.

27. A method of making a fuel cell fuel flow regulator comprising:
coating a column or a packing material with a gas adsorbing material and inserting said column or packing material into a fuel cell flow path;
wherein said gas adsorbing material further comprises a polysiloxane.

28. A fuel regulation system comprising:
means for generating electricity directly from an electrochemical reaction;
means for holding a supply of fuel;
means for transferring fuel in said means for holding to said means for generating; and
means for chemically regulating fuel flow through said means for transferring;
wherein said means for chemically regulating comprises a solid-state adsorptive material,
wherein said solid-state material is disposed in a gas chromatography column disposed in said means for transferring.

29. The system of claim 28, wherein said gas chromatography column comprises said solid-state adsorptive material on a porous support.

30. The fuel cell system of claim 29, wherein said adsorptive material comprises a carbowax.

31. A method of passively decreasing a pressure or flow rate spike in a flow of fuel through a fuel flow path between a fuel cell and a fuel source comprising disposing an adsorptive material in said fuel flow path between said fuel cell and said fuel source, wherein said adsorptive material selectively adsorbs said fuel for a period of time and then releases said fuel so as to decrease a pressure or flow rate spike in said flow of fuel.

32. The method of claim 31, further comprising adsorbing fuel that is flowing from said fuel source with solid-state material.

33. A method of passively decreasing a pressure or flow rate spike in a flow of fuel between a fuel cell and a fuel source comprising disposing an adsorptive material between said fuel cell and said fuel source, wherein said adsorptive material comprises a solid-state material and selectively adsorbs said fuel to decrease a pressure or flow rate spike in said flow of fuel, wherein said solid-state material is disposed in a gas or gas-soild chromatography column.

* * * * *